(12) United States Patent
Olson et al.

(10) Patent No.: US 6,453,378 B1
(45) Date of Patent: Sep. 17, 2002

(54) PORTABLE COMPUTER WITH ENHANCED PERFORMANCE MANAGEMENT

(75) Inventors: Anthony Olson, Dakota Dunes; Jerry L. Beckman, Elk Point, both of SD (US)

(73) Assignee: Gateway, Inc., North Sioux City, SD (US)

( * ) Notice: Subject to any disclaimer, the term of this patent is extended or adjusted under 35 U.S.C. 154(b) by 0 days.

(21) Appl. No.: 09/212,614

(22) Filed: Dec. 16, 1998

(51) Int. Cl.[7] .............................. G06F 13/00; G06F 1/08
(52) U.S. Cl. ........................ 710/304; 713/322; 361/687
(58) Field of Search ................................. 361/687–697, 361/704, 707, 709, 710, 714, 717–722; 713/300, 322, 323, 324; 710/304

(56) References Cited

U.S. PATENT DOCUMENTS

| | | |
|---|---|---|
| 5,394,552 A | 2/1995 | Shirota |
| 5,463,742 A | 10/1995 | Kobayashi |
| 5,530,879 A | 6/1996 | Crump et al. |
| 5,537,343 A | 7/1996 | Kikinis et al. |
| 5,586,270 A | 12/1996 | Rotier et al. |
| 5,598,537 A | 1/1997 | Swanstrom et al. |
| 5,627,974 A | 5/1997 | Watts, Jr. et al. |
| 5,689,654 A | 11/1997 | Kikinis et al. |
| 5,694,292 A * | 12/1997 | Paulsel et al. ............... 361/686 |
| 5,757,615 A * | 5/1998 | Donahoe et al. ............ 361/687 |
| 5,768,101 A | 6/1998 | Cheng |
| 5,884,049 A * | 3/1999 | Atkinson .................... 710/101 |
| 5,969,939 A * | 10/1999 | Moss et al. ................. 361/686 |
| 5,973,920 A * | 10/1999 | Altic et al. ................. 361/687 |
| 5,974,556 A * | 10/1999 | Jackson et al. ............. 713/322 |
| 5,974,557 A * | 10/1999 | Thomas et al. ............. 713/322 |
| 6,038,128 A * | 3/2000 | Hood, III et al. ........... 361/687 |
| 6,047,766 A * | 4/2000 | Van Brocklin et al. . 165/104.26 |
| 6,084,769 A * | 7/2000 | Moore et al. ............... 361/687 |
| 6,181,553 B1 * | 1/2001 | Cipolla et al. .............. 361/687 |

* cited by examiner

Primary Examiner—Glenn A. Auve
(74) Attorney, Agent, or Firm—Schwegman, Lundberg, Woessner & Kluth, P.A.

(57) ABSTRACT

A portable computer system has heat transfer mechanisms incorporated therein for transfer of heat to a docking station with active cooling capacity. A portable computer case has openings placed in alignment with mating openings in the docking station to provide additional active cooling capacity. The portable computer system case also has further openings and a defined air flow path to enhance airflow across a processor to cool it more effectively. A fan in the docking station pulls or pushes air from or into the portable computer system case. The mating openings and further openings in the computer system case are positioned to optimize the cooling effectiveness of the air flow with respect to the processor and other heat producing components. Other devices such as refrigeration coils, heat slugs, and heat pipes are also described. A switch detects when the portable computer is connected to the docking station and causes deactivation of processor slowing power management routines.

8 Claims, 6 Drawing Sheets

PORTABLE COMPUTER WITH ENHANCED PERFORMANCE MANAGEMENT

FIELD OF THE INVENTION

The present invention relates to portable computer systems, and in particular to the management of performance and power consumption in a portable computer.

BACKGROUND OF THE INVENTION

Portable computer systems have always lagged their desktop counterpart personal computers in speed and overall performance due to the limited power available in current batteries. Because the latest and fastest computer components, such as processors consume more power and generate more heat than lower speed components, they are not normally used in portable computer systems such as laptop computers. The use of high speed central processing units (CPUs) requires higher clock speed and higher voltages than current CPUs used for portable computer systems because the higher clock speed and higher operating voltage results in more power being consumed and thus heat being generated. The cooling of such components requires greater power, or larger heat sinks, which is readily available in larger desktop type computer systems.

Due to space constraints, thermal considerations and limited battery life, some portable computers employ various power management methods to reduce generation of heat while operating on battery power such that fans are not activated. Such methods include the reduction of the speed of the processor. When AC power is provided, the processor may run at higher speed and/or higher voltage, however, the cooling capability may not be sufficient to properly cool a portable computer using the current fastest processors and other components. Either there is not sufficient room for a large enough heat sink for the processor, or a large enough fan would consume so much power that the battery would not last long enough to meet current user expectations.

There is a need for a portable computer which can utilize the faster processors that generate more heat than can currently be dissipated by portable computers. There is a further need to operate such processors at higher speed at selected times. There is yet a further need to provide such abilities without using larger heat sinks or other solutions that would increase the size and or weight of such portable computers.

SUMMARY OF THE INVENTION

A portable computer receives addition cooling capabilities from an external docking station. The portable computer detects such cooling capacity and modifies its performance. In one embodiment, the portable computer system has a case with openings placed in alignment with mating openings in a docking station which provides additional active cooling capacity. The portable computer system case also has further openings and a defined air flow path to enhance airflow across a processor to cool it more effectively.

In one embodiment, the active cooling provided by the docking station is a fan, or other device which pulls or pushes air from or into the portable computer system case. The mating openings and further openings in the computer system case are positioned to optimize the cooling effectiveness of the air flow with respect to the processor and other heat producing components. Further active cooling apparatus include a compressor coupled to refrigeration coils positioned beneath the portable computer, and other devices which provide active cooling such as by refrigeration or sound and diaphragm combinations. Still further embodiments utilize heat pipes positioned proximate the processor of the portable computer and functioning to transfer heat to the docking station where active heat transfer is provided. Yet further embodiments utilize extruded aluminum slugs to transfer heat from the bottom of the portable computer to the active cooling mechanism provided in the docking station.

In one embodiment, power management functions of the computer system are alerted that the portable computer has been docked with the docking station. Once alerted, the power management functions allow the processor to operate at higher speed, relying on the extra cooling capacity provided by the docking station to properly cool the processor. In a further embodiment, the power management functions simply rely on temperature sensing to control the processor speed.

The extra cooling capacity provided by the docking station then allows the processor to run indefinitely at higher speed. The extra cooling capacity may also provide the ability to utilize faster, more expensive processors which generate more heat without sacrificing the power of the processor when docked. It further enhances the ability to obtain desktop performance from a docked portable computer, while retaining the ability to slow the CPU speed, and/or operating voltage to obtain longer battery life when undocked.

DETAILED DESCRIPTION

Figure 1:
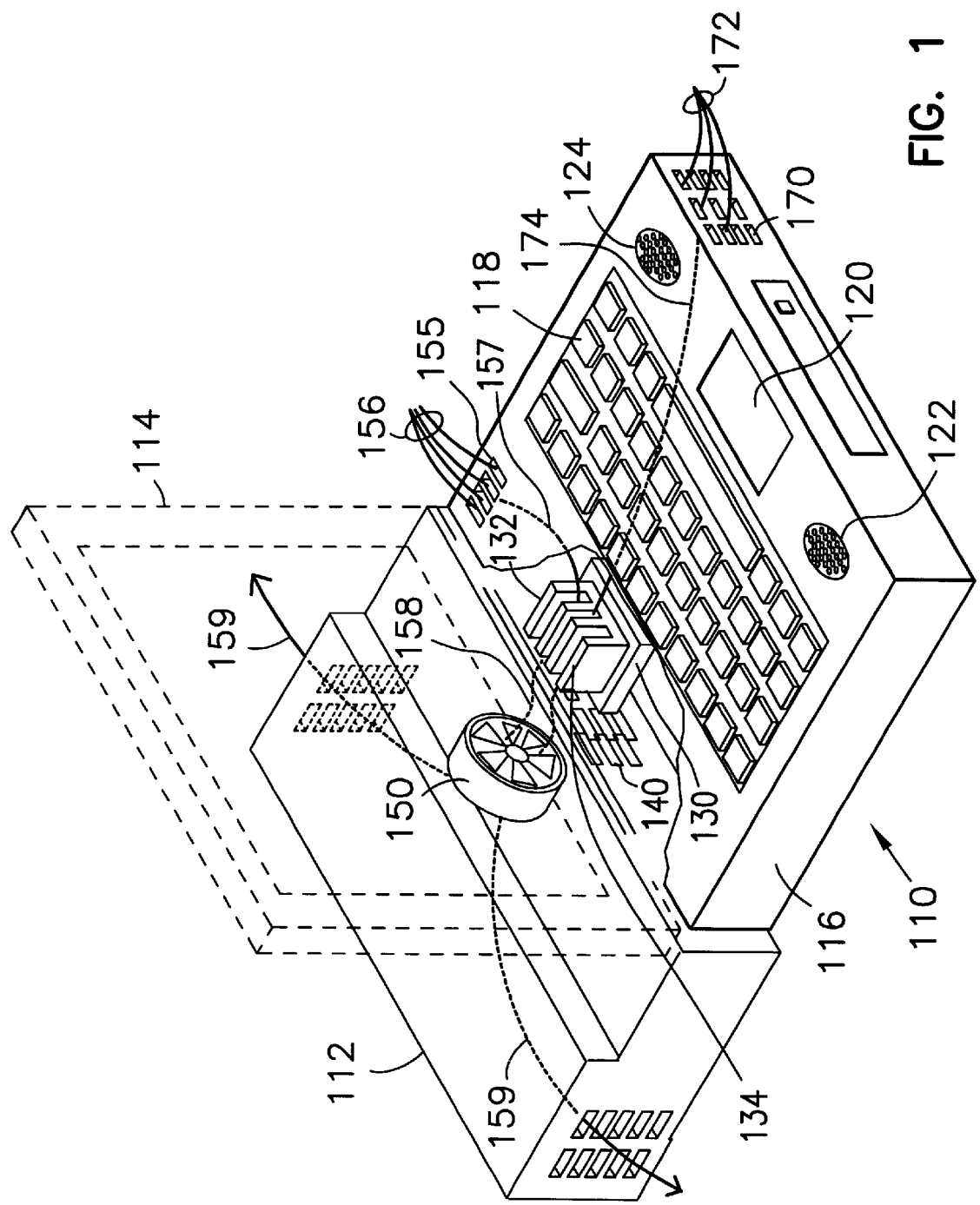
FIG. 1 is a cut away perspective of a portable computer docked with a docking station.

In the following description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

A portable computer system is indicated generally at 110 coupled to a docking station 112. The portable computer system has a display device 114 (indicated in broken line form) rotatably coupled to one end of a portable computer system case 116. In one embodiment, the portable computer system 110 is a Gateway 2000, Inc Solo® having a keyboard 118, a touchpad 120, speakers 122 and 124 and other commonly provided accessibly computer peripheral and connectors. The case 116 is shown in cutaway form to expose a processor 130. In one embodiment, the processor 130 has a heat sink 132 mounted thereon with fins 134 to help dissipate heat when cooling is effected in both a passive mode, or an active mode. Thus, the need for a fan located within the computer system case 116 is either eliminated, or a smaller fan may be employed as desired.

The processor 130 is mounted in the case 116 proximate a plurality of mating openings 140. The mating openings 140 mate with counterpart openings in a case of the docking station 112 which contains a fan 150 mounted therein for drawing or moving air from the computer system case 116 through mating openings 140 to help cool the processor 130. The docking station 112 also contains a power supply for providing additional power to allow the portable computer system 110 to operate at higher voltages and/or amperages.

Air intake openings 155 are indicated in the top of case 116 and positioned to one side of the processor 130. Air is drawn in through intake openings 155 as represented by lines 156. The air is then drawn through the fins 134 of heat sink 132 as represented by line 157 and out through the mating openings 140, through the docking station as represented by lines 158 and out of the docking station past the fan 150 as indicated by lines 159.

Processor 130 in the past has been mounted on an aluminum backing plate for keyboard 118, which acts as a heat sink. In the present invention, the processor is mounted in such a manner as to enable outside air to be drawn past it and then into the docking station through the mating openings 140. While shown in the embodiment of FIG. 1 as residing near the back of the case, proximate the docking station, and between the air intake openings 155 and mating openings 140, it will be recognized that it could be positioned otherwise within the portable computer case 116 while still obtaining the same cooling effects, provided that the air intake and mating openings are also repositioned proximate the processor, or in a position to help create a well defined airflow past the processor heat sink.

Further air intake openings are optionally provided on a front edge of the computer case as indicated at 170 for drawing in air as represented by lines 172. Air intake openings may be positioned wherever desired, resulting in airflow operating to cool other components which generate undesired heat, as represented by airflow line 174.

Figure 2:
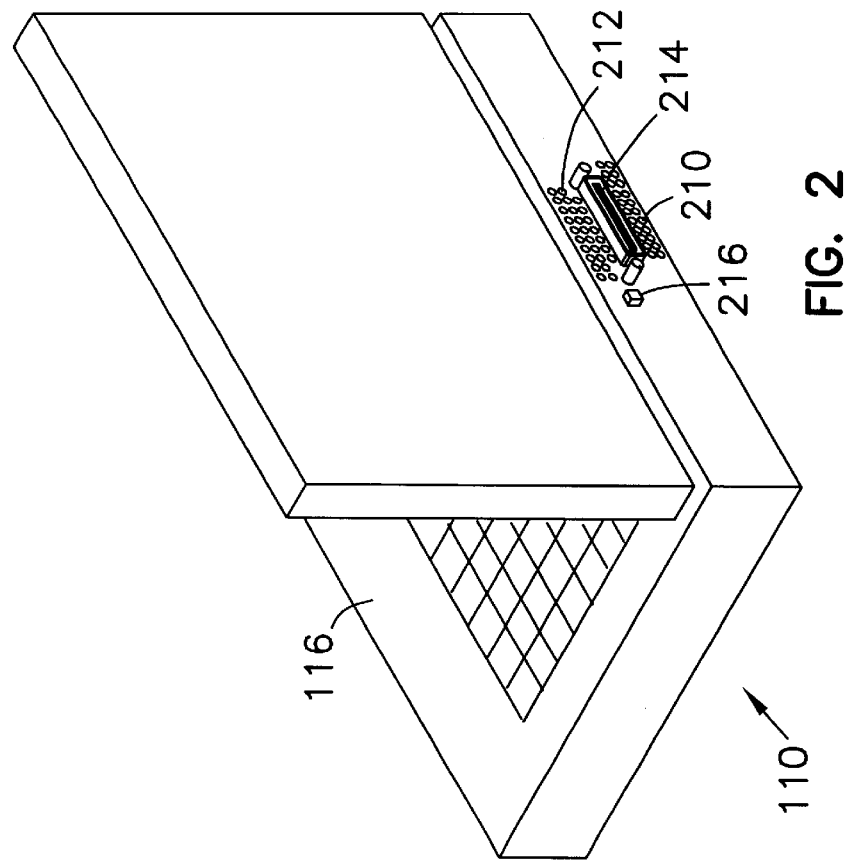
FIG. 2 is a rear perspective representation of the portable computer of FIG. 1.

In FIG. 2, a rear elevation view of portable computer 110 is shown with a first set of mating openings 210 and second set of mating openings 212 located on either side of a docking electrical connector 214 which comprises a PCI bus in one embodiment, but may also be infrared or other electromagnetic communication device. A separate switch 216 is also located in a position on the rear of the portable computer to come into contact with a corresponding switch contact 316 shown in FIG. 3 on the docking station 112.

These switches are well known in the art, and may take many different forms, from mechanically actuated to electrically actuated. The switch 216 is coupled in a known manner to provide an indication to power management software running on processor 130 that the portable computer is docked, and receiving additional cooling capacity. The switch or contact 316 is coupled to the docking station power supply and may be used to automatically initiate the provision of AC power and turn on fan 150 to provide cooling. It may also just be a plastic projection that actuates switch 216 to indicate that the docking station has been successfully coupled to the portable computer.

Figure 3:
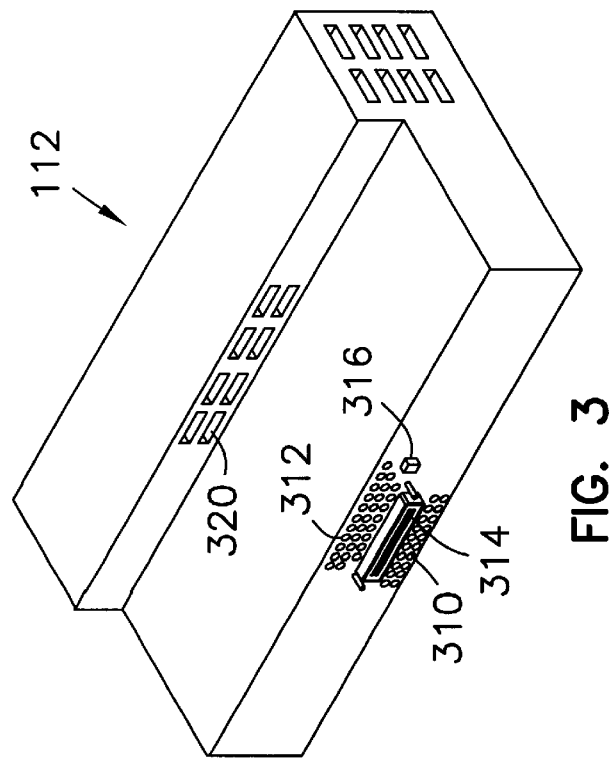
FIG. 3 is a front perspective representation of the docking station of FIG. 1.

A front view of docking station 112 in FIG. 3 also comprises mating openings 310 formed in the docking station case which mate with openings 210 on the computer case 116, and also comprises openings 312 which mate with openings 212. A further plurality of openings 320 are provided proximate the fan 150 to provide for the exit of air drawn in from the portable computer. Further, a female connector 314 mates with a male connector 214 on the computer case to provide communications between the computer and the docking station. Docking station 112 further comprises a switch 316 to indicate successful coupling to the portable computer. Many docking stations or docking bars provide AC power and further peripheral devices such as disk drives and network cards, all as represented by docking station 112.

Figure 4:
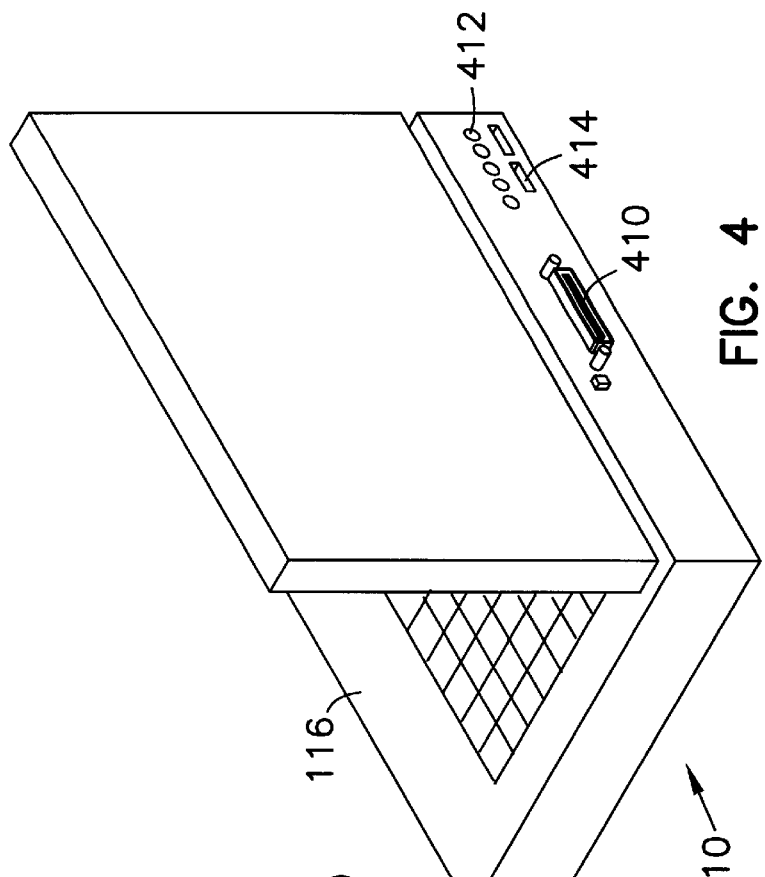
FIG. 4 is a rear perspective representation of an alternative embodiment of the portable computer of FIG. 1.
Figure 5:
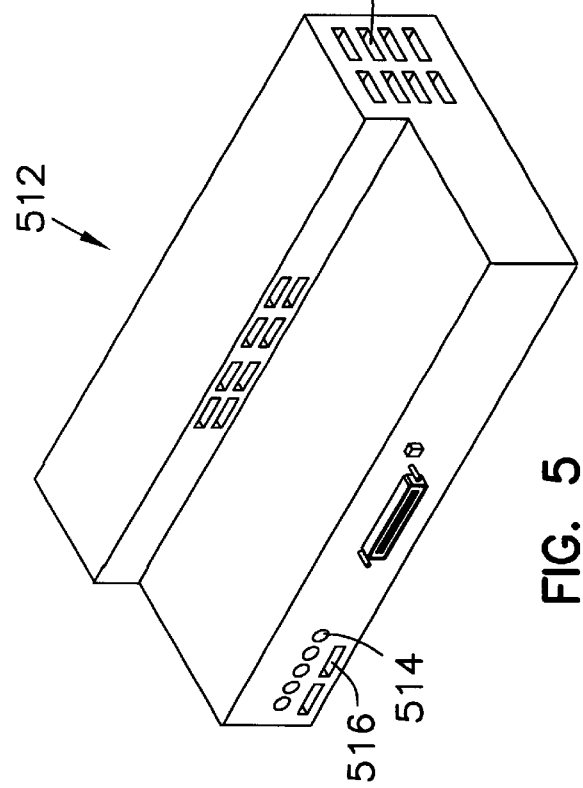
FIG. 5 is a rear perspective representation of an alternative embodiment of the docking station for mating with the alternative embodiment of the portable computer of FIG. 4.

FIG. 4 shows a portable computer 410 having an alternative positioning of mating openings indicated at 412 and 414. Openings 412 comprise circular holes formed in the case, either as the case is molded, or after the case is formed the openings are formed as by drilling. Further openings 414 are oval or elongated circles as shown to provide for even greater airflow. Openings 414 and 412 are located near the bottom of the back side of the computer case. Since the processor is also located near the bottom of the computer case, more air is likely to be directed through the fins of the heat sink, providing even better cooling. While these openings are shown off to one side of the case, they could be located anywhere along the back side of the case depending on the placement of the processor and the air intake holes. Both of these sets of openings are designed to mate with similar openings shown at 514 and 516 of and alternative docking station indicated at 512 in FIG. 5. Further, larger, elongated openings are shown at 520 for the exhaustion of air from the docking station 512. It should be noted that the types of openings may easily be modified by one of average skill in the art to many different shapes to obtain desired airflow characteristics. With the openings located toward one side of the computer as shown in FIG. 4, the placement of the air intake openings and the processor heat sink will also need to modified. In one embodiment, the fins of the heat sink may be placed so that the run from the front to the back of the computer, at right angles from that shown in FIG. 1. The fins could also be placed to encourage direct airflow between the intake and exhaust (mating) openings. In this case, the fins may be placed at any angle relative to the case of the computer. The placement of openings and the processor may be dictated by the need to place many components inside of a limited space case. Thus, the freedom to modify the angle or orientation of the fins provides more design freedom in locating such other components while still maintain the advantages provided by the present invention.

Figure 6:
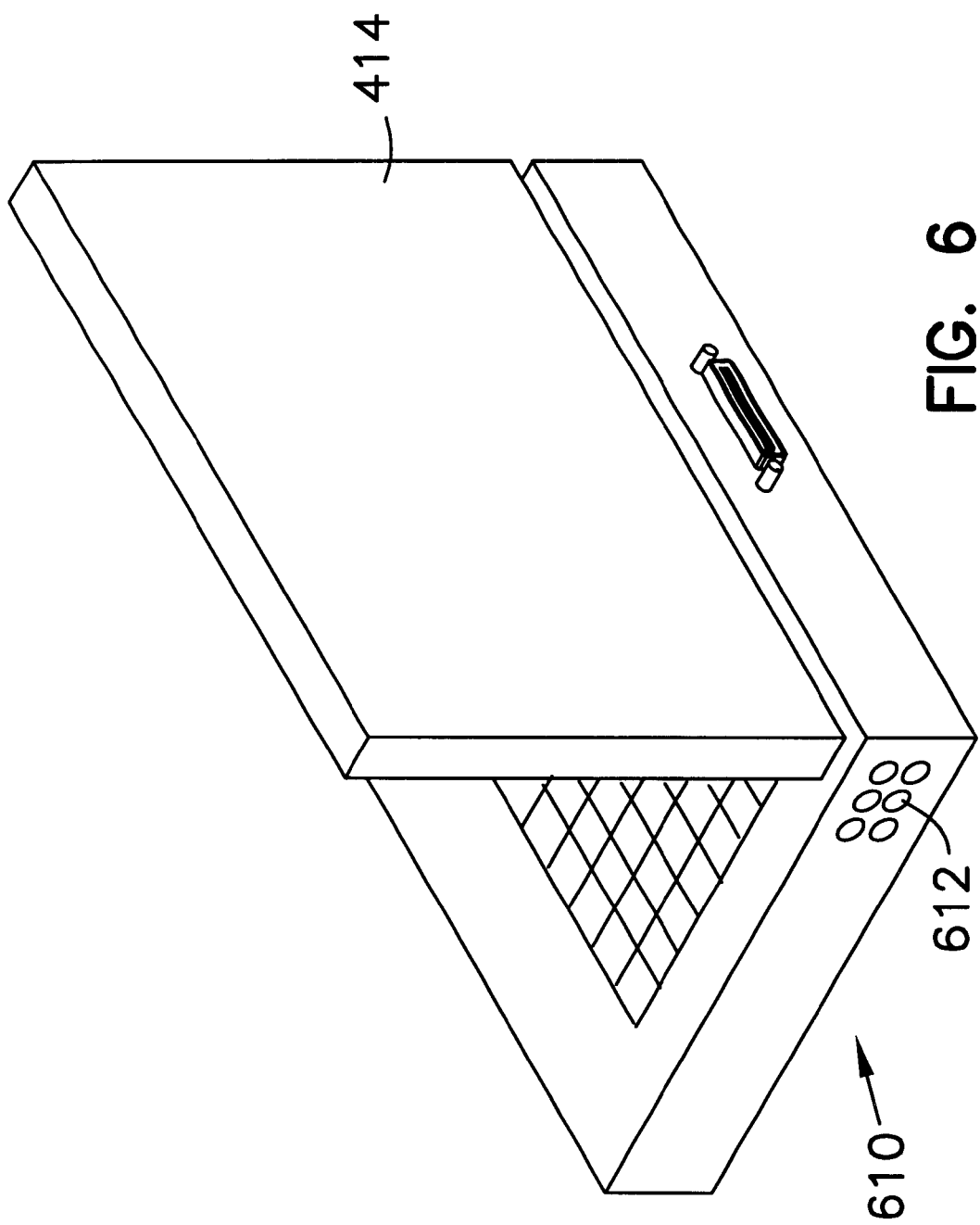
FIG. 6 is rear perspective representation of an embodiment of the portable computer of FIG. 1.

FIG. 6 represents yet a further embodiment of the invention wherein air intake openings 612 are provided on a side of a computer case 610. This placement of intake openings provides more freedom in the use of the portable computer when docked. Many times, a display 414 of the portable computer does not have the quality and ease of viewing associated with large screen CRT displays which are often provided by with docking stations. In the event that such a CRT display is being used, the display 414 of the portable may be in a locked down position, which could block the flow of air in through intake openings 155 in FIG. 1. Providing air intake openings 612 on the side of the computer case 610 reduces such a problem. It may also allow for more air to flow evenly across the fins of the heat sink, since the air will be following more of a straight path from the side rather than from the top.

Figure 7:
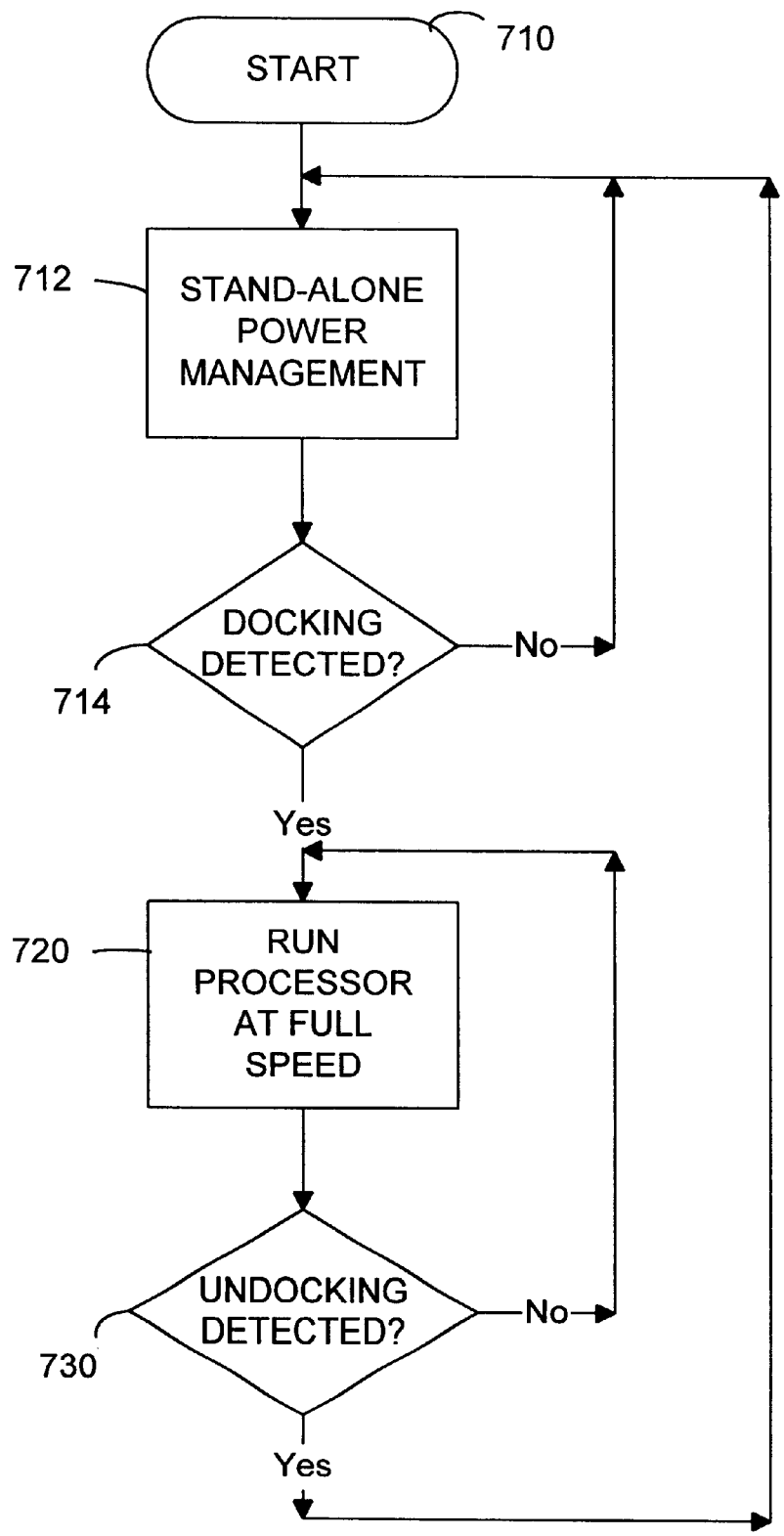
FIG. 7 is a flow chart of power management performed by a portable computer.

As mentioned above, present power management systems of portable computers slow down the processor to avoid excess generation of heat by the processor which cannot be effectively dissipated. An improved power management system is represented by the flowchart represented in FIG. 7. The flowchart is representative of code modules or a module running on the processor 130, or other electronic device or machine as desired, and may be hardcoded, hardwired, or written in software and stored on machine readable media such as RAM, CDROM, or disk drive to name but a few. It may also be received via network and run directly from the network. The flowchart is entered at 710 upon power up of the portable computer. At 712, the normal power management functions are run, which result in processor speeds being cut and hence performance reduced. At decision block 714, an interrupt resulting from the docking switch 216 being triggered indicates that docking as been detected. In one embodiment, the docking switch is sensitive to only a docking station which provides additional cooling functionality. If no docking has been detected, the normal standalone power management is continued. However, if docking is detected, the power management system runs the processor at higher speed or cycle time at 720 relying of sufficient cooling being provided by the docking station or docking bar. If undocking is detected at 730, again as indicated by the switch 216, standalone power management is reentered at 712. In further embodiments, the power management systems also decrease the operating voltage with decreases in operating speed. This further decreases the power consumed in power conservation modes.

Figure 8:
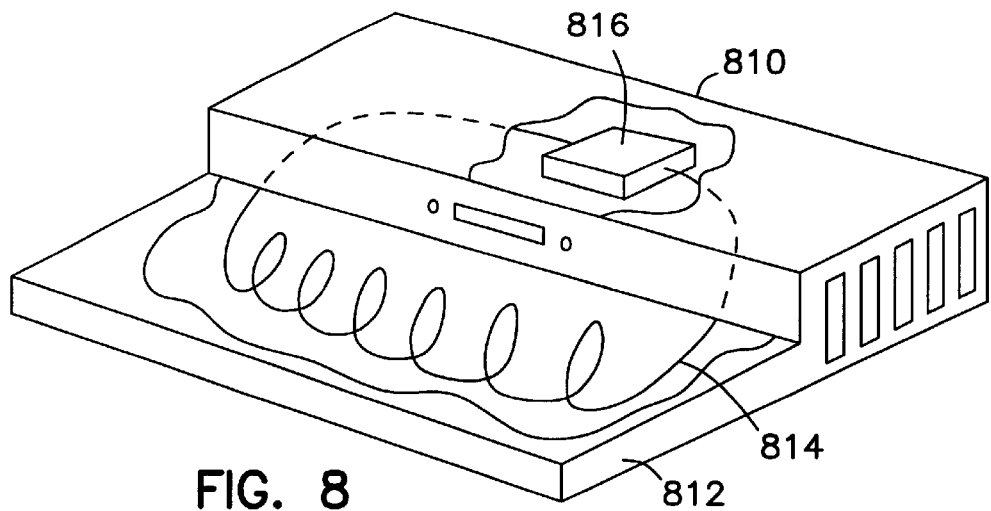
FIG. 8 is a front perspective cutaway representation of an alternative docking station for mating with a portable computer.

In FIG. 8, a further alternative embodiment of a docking station 810 provides active cooling by means of refrigerative cooling. In a cutaway portion of a base support 812 of the docking station 810 corresponding to where a portable computer would rest when engaged with the docking station, a cooling coil is shown at 814. The cooling coil may be filled with any type of fluid, such as water or gas, or common refrigerant to provide cooling for the portable computer. A compressor is shown at 816 which is coupled to the coil 814 in a common manner. The compressor 816 may be a common compressor used in refrigeration systems, or may be just a fan which provides cooling of the portion of the coil 814 proximate to it.

Figure 9:
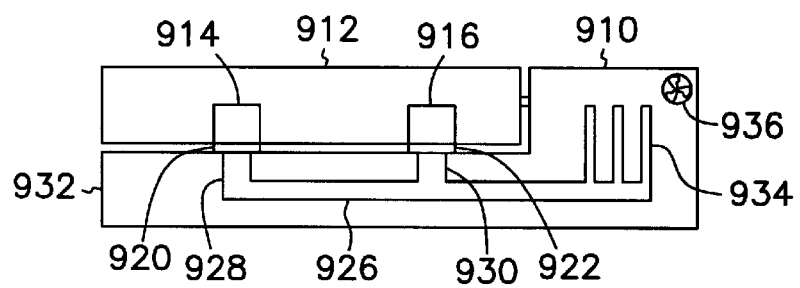
FIG. 9 is a side cross sectional cut away block representation of a combined docking station and portable computer showing a further embodiment of the present invention.

In FIG. 9, yet a further alternative embodiment showing how active cooling of a portable computer 912 is provided by a docking station 910. The portable computer 912 comprises two cooling blocks 914 and 916 which may be heat sinks coupled to one or more processors or other heat producing elements within the portable computer. Cooling blocks 914 and 916 are coupled through heat transfer pads 920 and 922 to a heat transfer rod 926 with corresponding projections 928 and 930 contacting the heat transfer pads 920 and 922. The pads may reside on the bottom of the portable computer, or on a docking station base 932, placed to contact the blocks 914 and 916 when the computer is operatively coupled to the docking station 910. Heat transfer rod 926 comprises an extruded aluminum slug in one embodiment, but could be made of any other material having desired heat transfer characteristics. The heat transfer rod 926 is then formed in the shape of fins 934 spaced a suitable distance from the portable computer. The fins are then actively cooled by fan or other cooling device 936.

Figure 10:
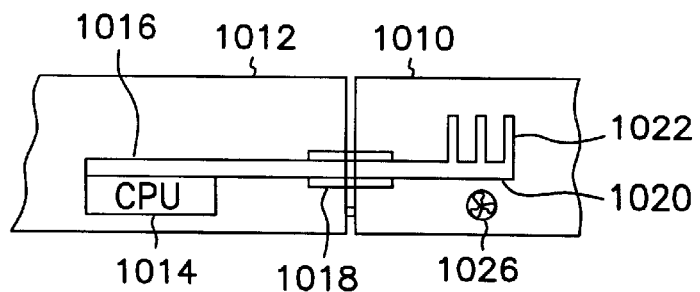
FIG. 10 is a side cross sectional cut away block representation of a combined docking station and portable computer showing a yet a further alternative embodiment of the present invention.

In a still further alternative embodiment shown in FIG. 10, a docking station 1010 provides active cooling for a portable computer 1012 by the use of heat pipes. A central processing unit CPU 1014 is located in the portable computer thermally coupled proximate a first heat pipe 1016. The first heat pipe is coupled via an aluminum collar 1018 mounted on the docking station 1010 to second heat pipe 1020 which may be fanned out into cooling fins at 1022 for cooling by an active cooling mechanism such as a fan 1026 positioned proximate the heat pipe within the docking station. In a variation, the heat pipe 1016 is coupled to a heat sink or other heat transfer mechanism in the docking station in place of the heat pipe and actively cooled by any of the previous methods described.

It is to be understood that the above description is intended to be illustrative, and not restrictive. Many other embodiments will be apparent to those of skill in the art upon reviewing the above description. For instance, the location of mating holes or openings along with the placement of the processor and the placement or orientation of the heat sink on the processor may be modified as desired or needed due to design constraints. Further, temperature sensors may be used to determine the speed at which the processor runs as opposed to the use of switches or other means. Further, the switches may be incorporated into the electrical connector, or simply be coupled to one of the connectors to determine if the impedance or other detectable characteristic of the connector has changed, indicating that the portable computer is coupled to a docking station or other type of device which provides both more power and active cooling capabilities. Moreover, the air flow may be modified such that the docking station moves air into the portable computer as opposed to only drawing air from it. The docking station also provides a common power supply, which when combined with the increased cooling abilities enables the computer to operate at higher voltages and/or amperages, which can increase the performance of the computer system. While a docking station is described, it should be clear that other types of devices that provide cooling may also be used although not normally referred to as a docking station. The scope of the invention should, therefore, be determined with reference to the appended claims, along with the full scope of equivalents to which such claims are entitled.

What is claimed is:

1. A portable computer operating at a variable speed, and having a computer case, the computer comprising:
    means for detecting coupling to an external docking station;
    a set of mating openings;
    a set of air intake openings;
    a processor located proximate the sets of openings;
    means for varying the speed of the computer based on detected coupling of the computer to the external docking station; and
    a heat sink coupled to the processor, wherein the heat sink comprises fins, and wherein the fins of the heat sink are oriented substantially perpendicular with respect to the mating openings and the air intake openings to enhance cooling of the processor.

2. The portable computer of claim 1 wherein the set of mating openings are positioned on a rear end of the computer case.

3. The portable computer of claim 1 wherein the means for detecting coupling to an external docking stations comprises a switch integrated into a connector for connecting the portable computer to the docking station.

4. The portable computer of claim 1 wherein the air intake openings are positioned on a side of the portable computer case.

5. The portable computer of claim 1 wherein the mating openings are positioned near the bottom of the back side of the computer case.

6. The portable computer of claim 1 wherein one of the mating openings comprise an elongated opening.

7. A portable computer comprising:

a mating opening located to mate with a corresponding opening in an external docking station, wherein the mating opening is positioned on a rear end of the portable computer;

an air intake opening, wherein the air intake opening is positioned on the side of the portable computer; and a processor having a heat sink mounted thereon and positioned in an airflow created between the mating opening and the air intake opening by an external docking station, wherein the heatsink comprises fins, and wherein the fins of the heat sink are oriented substantially perpendicular with respect to the mating opening and the air intake opening to enhance cooling of the processor.

8. The portable computer of claim 7 and further comprising a temperature sensor.

* * * * *